Feb. 27, 1962 R. L. DREYFUS ET AL 3,022,614
VACUUM FORMING OF PLASTIC MATERIAL
Filed May 21, 1959 3 Sheets-Sheet 1

INVENTORS
ROBERT L. DREYFUS
JOHN W. HARRISON
ROBERT D. LOWRY
BY Cushman, Darby, + Cushman
ATTORNEYS

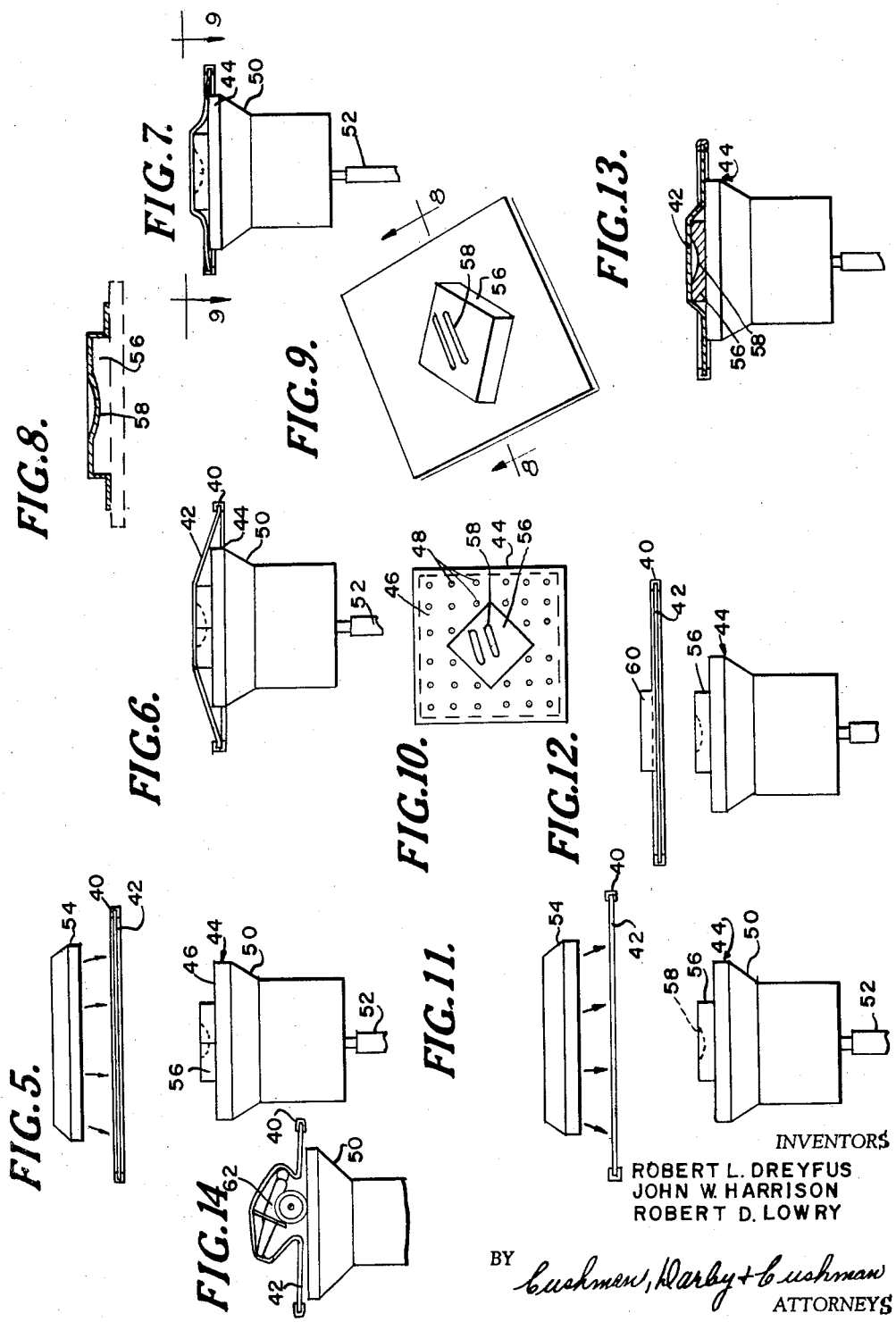

Feb. 27, 1962    R. L. DREYFUS ET AL    3,022,614
VACUUM FORMING OF PLASTIC MATERIAL
Filed May 21, 1959    3 Sheets-Sheet 3

INVENTORS
ROBERT L. DREYFUS
JOHN W. HARRISON
HOBERT D. LOWRY
BY Cushman, Darby & Cushman
ATTORNEYS

United States Patent Office 3,022,614
Patented Feb. 27, 1962

3,022,614
VACUUM FORMING OF PLASTIC MATERIAL
Robert L. Dreyfus, Arlington, and John W. Harrison and Robert D. Lowry, Winchester, Mass., assignors to W. R. Grace & Co., Cambridge, Mass., a corporation of Connecticut
Filed May 21, 1959, Ser. No. 814,801
3 Claims. (Cl. 53—30)

This invention relates to the vacuum forming of objects from orientable films, more particularly irradiated polyolefins, such as irradiated polyethylene and irradiated polypropylene.

It is an object of the present invention to make shrinking blister packages.

A further object is to devise a novel procedure for laminating orientable, thermoplastic films.

An additional object is to develop now uses for irradiated polyethylene and polypropylene.

Another object is to develop an improved vacuum drawing technique.

A still further object is to provide controlled stretching of polymers, such as irradiated polyethylene whereby there can be produced products having different parts of varying thickness and degree of stretch.

Yet another object is to prevent the breaking or tearing of film made from materials such as irradiated polyethylene during vacuum drawing over objects having sharp corners or projections.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by vacuum drawing irradiated polyethylene or polypropylene in accordance with the disclosure hereinafter.

Certain of the presently preferred embodiments of the invention are illustrated in the accompanying drawings wherein:

FIGURE 5 is a schematic illustration of the first stage in a different method of vacuum drawing;

FIGURE 6 is a view similar to FIGURE 5 but at a later stage in the process;

FIGURE 7 is a view similar to FIGURE 6 but taken at the completion of the process;

FIGURE 8 is a sectional view taken along the line 8—8 of FIGURE 9;

FIGURE 9 is a perspective view along the line 9—9 of FIGURE 7;

FIGURE 10 is a top elevation of the mold employed in FIGURE 6;

FIGURE 11 is a schematic illustration of the first stage in a modified method of vacuum drawing;

FIGURE 12 is a view similar to FIGURE 11 but at a later stage in the process;

FIGURE 13 is a view similar to FIGURE 12 but taken at the completion of the process;

FIGURE 14 is a view similar to FIGURE 7 showing vacuum drawing around a cannon;

In the illustrative examples in describing the invention in connection with the drawings there was employed Alathon 14 film (polyethylene, molecular weight about 20,000, density 0.916) which had been irradiated to an extent of 12 megarad.

Figure 1:
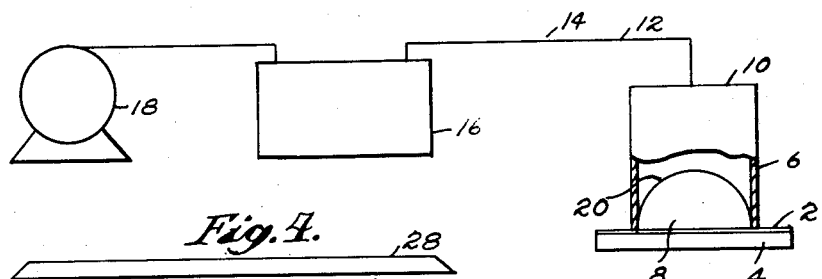
FIGURE 1 is a diagrammatic view, partially in section illustrating one form of vacuum drawing.
Figure 4:
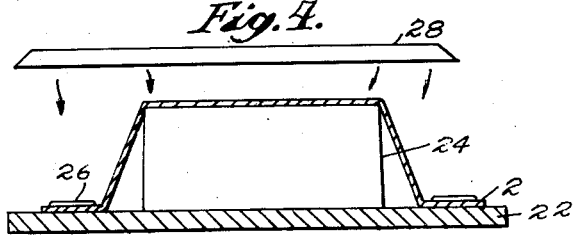
FIGURE 4 is a vertical section illustrating the shrinking of the film cover of FIGURE 2.
Figure 2:
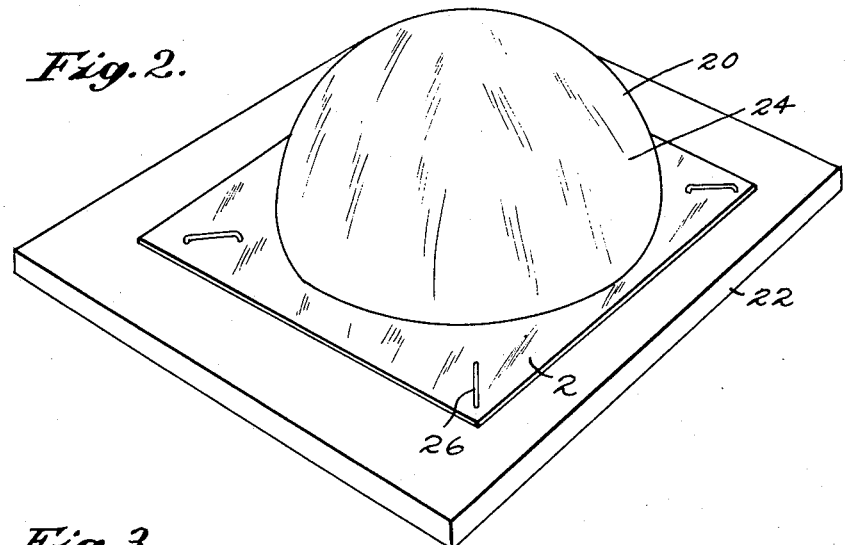
FIGURE 2 is a perspective view of a blister package.

FIGURES 1–4 of the drawings illustrate a process wherein orientable film, e.g., irradiated polyethylene, can be used to make shrinking blisters of shapes varying from nearly perpendicular sides to special shapes, e.g., an hour glass shape. According to the process, there is provided an irradiated polyethylene tape or film 2 which is positioned over sponge rubber support 4. The tape is heated, e.g., with a hot air blower, to the softening point (about 175° C.). There is provided a core or female mold 6 which can be of any desired shape. In FIGURE 1, it is in the form of a cylinder having its lower end 8 open. The upper end 10 of the core has a narrow opening connected via line 12 and valve 14 to vacuum reservoir 16 and vacuum pump 18. With the vacuum operating and valve 14 open, the core 6 is placed over the heated tape. The core is held down over the tape for 15–30 seconds. Immediately, a blister 20 begins to form in the tape inside the core. After the blister has reached the desired height, the vacuum is shut off, the core removed from the sponge rubber, and the blister taken out of the core. The blister comprises stretched irradiated polyethylene and is in the middle of the irradiated unstretched tape. An object 24, e.g. a block of wood, is placed on a card 22, the blister 20 positioned over the object and fastened to the card by any suitable means such as staples 26. The blister is then heated from any suitable heat source 28 and the blister is shrunk to give a tight package around the object, as shown in FIGURE 4. This procedure can be employed to package golf balls, screws, electric plugs, and other widely varied objects. The open face of the blister can be sealed to a separate layer of film or suitably treated card by the use of heat rather than stapling.

The technique of the present invention can also be employed for forming liners directly in a drum or carton. In such case, the drum serves as the core and the blister formed is allowed to remain therein as the liner. The liner can be tack sealed to the carton by heat or by adhesives. Then the top and bottom of the drum can be positioned. It is also possible to form pouch-like seamless bags by this method.

Figure 3:
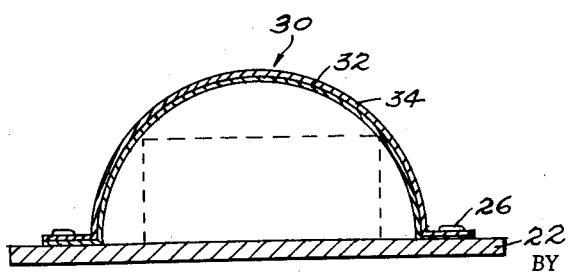
FIGURE 3 is a vertical section of a blister package similar to that of FIGURE 2 but employing a film laminate.

As shown in FIGURE 3, if two separate pieces of film are heated while in contact and then exposed to the vacuum drawing operation described in connection with FIGURE 1, they result in the formation of a heat laminated blister 30 comprising plies 32 and 34. The laminated blister can be heat shrunk in the same manner as blister 20. The adhesion between the plies is so strong that separation of the plies does not take place.

In the process illustrated in FIGURES 5–10 there is provided a rack or frame 40 which clamps sheet 42 of irradiated polyethylene on all four sides and thereby restrains the same. Immediately below rack 40 is a mold block 44, the top 46 of which is smaller in area than the rack. A plurality of small holes 48 on the top surface of the block are connected via manifold 50 and line 52 of a vacuum pump (not shown). Immediately above the rack 40 is a source of heat 54 which can be brought into close proximity to the irradiated polyethylene sheet. A male mold shape 56, e.g., containing two grooves 58, to be duplicated is placed on the mold block. The size of the mold 56 must be smaller than the top of the mold block in order that sufficient vacuum openings will be available to vacuumize satisfactorily. In carrying out the process, the irradiated polyethylene sheet 42 is placed in the frame, restrained on all four sides and heated for about 45 seconds to attain a temperature of about 175° C. and the heat source removed. The vacuum system was then started and immediately, while the film was still hot, the rack 40 was lowered over the mold shape 56. The edges of the mold block 44 formed a seal with the draped film 42 so that a vacuum was pulled and the film was stretched over the mold 56. As shown in FIGURES 8 and 9, the film assumed the configuration of the mold shape 56. The grooves in the mold were accurately reproduced in the film.

FIGURES 11-13 show the effect of pre-cooling a portion of the film prior to the vacuum drawing operation.

In operating according to FIGURES 11-13, the same procedure was employed as was followed with FIGURES 5-10 except that after the film was heated, a chilled mold 60 at a temperature of 40° F. was rested on the film 42 for about 2 seconds over the area which was to subsequently come in contact with the mold 56. The cooling block was then removed and the rack with the film was lowered over the mold and the vacuum applied in the manner described in connection with FIGURES 5-10. However, the film had cooled sufficiently so that the portion of the irradiated polyethylene film directly over the top of the mold 56 did not "draw" and the two grooves on the top of the mold were not produced in the final product (FIGURE 13).

While the films used for preparing the vacuum drawn products of FIGURES 8 and 13 were of identical size and thickness (10.5 mil), the top of the film obtained in FIGURE 13 was thicker (10.4 mil) than the top of the film obtained in FIGURE 8 (8.6 mil). The reason for this is the spot cooling which prevented the drawing. Any area or pattern of areas can be spot cooled to result in a thicker portion after the vacuum drawing operation.

Alternatively, there could be used cooled insert slugs in the mold or a fluid coolant running through areas of the mold which were thermally insulated from the rest of the mold, if such areas were located where the film would strike them first as the drape was lowered.

Furthermore, spot cooling can be accomplished by utilizing tongs with chilled tips which would remove heat from both sides of the sheet of polyethylene simultaneously.

The vacuum drawing technique of the present invention can be utilized with irradiated polyethylene or other thermoplastic films to prevent punctures of the film by objects having sharp corners which also require fairly deep drawing. For example, if the object to be covered is chilled, e.g., in a 40° F. refrigerator, before the drawing, it has been found that enough heat is absorbed from the film by the sharp projections on the object so that the film resists puncturing.

In a specific example, 10 mil thick irradiated polyethylene film or tape 42 was placed in a frame 40, as shown in FIGURE 5. The tape was heated for about 45 seconds and the heat source removed. A toy cannon 62 having many sharp projections, a very irregular shape and a relatively great height to base area ratio was chilled in a refrigerator to about 40° F. and then placed on the top 46 of mold block 44 in place of the mold shape 56. The vacuum was turned on and the frame with the preheated film lowered as previously explained in connection with FIGURE 6. The film was found to draw down without rupture, pulling out to less than ½ mil in thickness in places. It was also noted that areas of film which were sucked together during the draw were found to adhere to each other, thus locking the cannon securely.

FIGURES 15-20 illustrate a procedure for obtaining a deeper draw without rendering the oriented film too thin.

Figure 15:
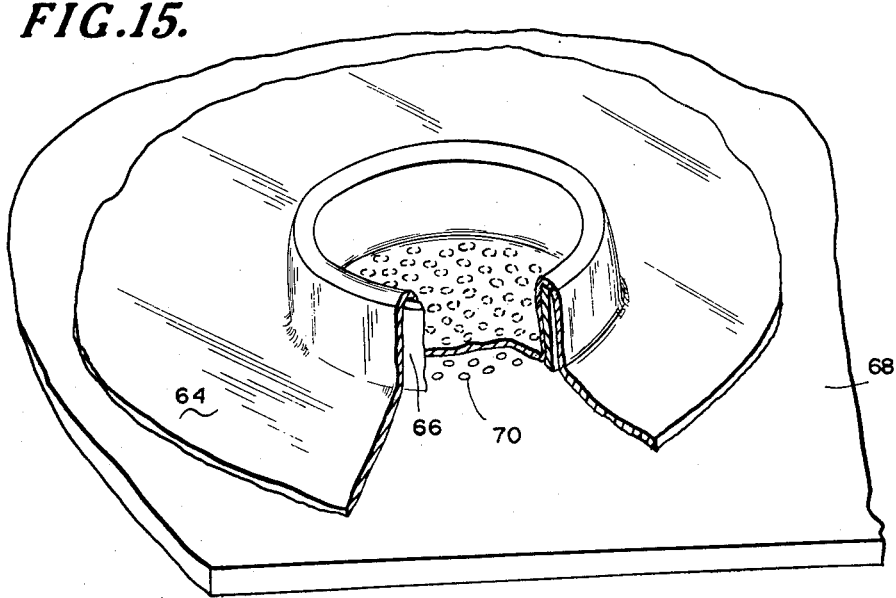
FIGURE 15 is a perspective view partially broken away illustrating another aspect of the vacuum drawing operation.
Figure 16:
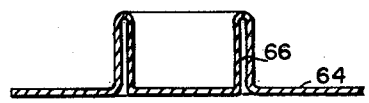
FIGURE 16 is a sectional elevation of the initial vacuum drawn article of FIGURE 15.

As shown in FIGURE 15, 10 mil thick irradiated unoriented polyethylene film 64 was preheated, draped over mold 66 and vacuum drawn. The mold 66 was positioned on a vacuum plate 68 having a plurality of small holes 70 connected to a vacuum pump (not shown). The mold 66 was a 4 inch deep cardboard core having a diameter of 3½ inches. The vacuum drawn film 64 was removed from the mold and pushed out to form the article 72 of FIGURES 17 and 18. Due to the rigidity of the irradiated polyethylene, it retained this new shape. The article 72 has a relatively narrow upper sidewall 74 and a relatively wide lower sidewall 76 joined together by connecting flange 78.

Figure 19:
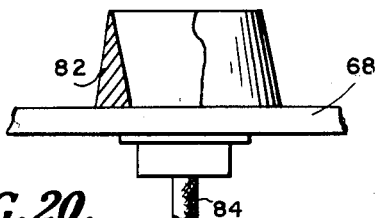
FIGURE 19 is a side elevation illustrating the vacuum drawing of a conical article.
Figure 17:
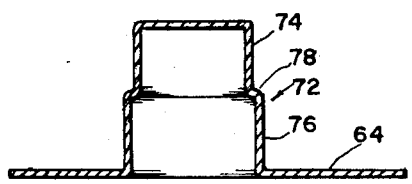
FIGURE 17 is a sectional elevation of the article of FIGURE 16 after it has been pushed out.
Figure 20:
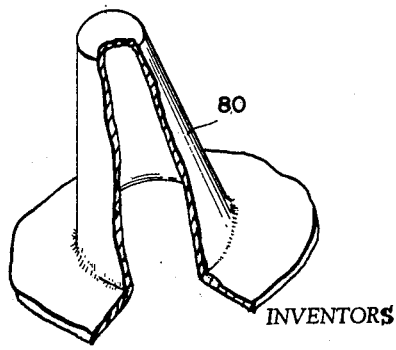
FIGURE 20 is a perspective view partially broken away in section of the finished article of FIGURE 19 after it has been pushed out.
Figure 18:
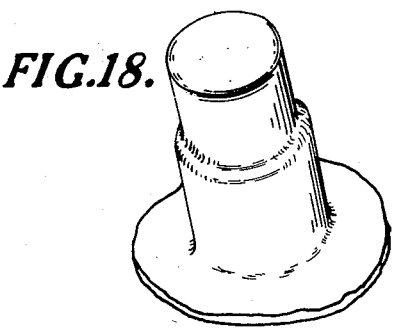
FIGURE 18 is a perspective view of the article of FIGURE 17.

Using the procedure described in connection with FIGURES 15-18, an article 80 (FIGURE 20) can be formed with the aid of hollow conical mold 82 (FIGURE 19). Article 80 has a smooth conical sidewall. Irradiated polyethylene film is preheated and then draped over the mold 82 positioned on vacuum plate 68 connected via line 84 to a vacuum pump (not shown). When the drawn film is pushed or snapped out in the manner previously set forth, the conical article 80 is formed having a height double that of the mold 82. Because of the conical design, the sidewall of the article 80 is smooth in the form of a truncated cone and there is no flange connecting the top and bottom portion of the sidewall.

In general, there is employed in the invention polyethylene film which has been irradiated to an extent of 2 to 100 megarad, preferably 6 to 20 megarad. The irradiation can be accomplished in conventional fashion, e.g., by the use of a high voltage resonant transformer, such as the 2,000,000 volt General Electric Resonant Transformer, or high energy particle generators of 50,000 to 50,000,000 volts or a Van de Graaff electron generator. In addition to the use of electrons, there can be employed beta rays, gamma rays, e.g., by employing cobalt 60, etc. There can be employed any of the known irradiation procedures which will produce a dosage of at least 2 megarad.

There can be employed as the starting polyethylene for the irradiation procedure high, low or medium density polyethylene prepared by low or high pressure techniques. The starting polyethylene can have a molecular weight of 7,000 or 12,000 or 19,000 or 21,000 or 24,000 or 35,000 or even higher.

In place of irradiated polyethylene, there can be employed similarly irradiated polypropylene. Polyethylene and polypropylene are polymers of an olefin having two or three carbon atoms.

In many instances there can be employed other heat softening plastic films which can be vacuum drawn rather than the specific polymers recited above.

Obviously, in the foregoing disclosure the orientable film may be partially oriented or partially stretched and further oriented or stretched during the vacuum-forming operation. Some films, particularly irradiated polyethylene, have the ability to be partially oriented and then further oriented in steps or stages.

In this specification, the reference to vacuum-forming or vacuum-drawing is equally applicable to pressure forming or the combination of vacuum and pressure forming to force the film into intimate contact with the surface of the mold. Pressure forming makes it possible to obtain greater pressure and therefore results in greater detail in the molded piece, but such a process requires heavier and more expensive equipment.

What is claimed is:

1. A process comprising positioning a plurality of superposed layers of film of polymerized olefin selected from the group consisting of polyethylene and polypropylene across an open portion of a vacuum mold, heating said superposed layers of film while in contact and applying the vacuum to simultaneously biaxially stretch orient the film within said mold and to heat laminate the layers to form a unitary blister.

2. A process according to claim 1 wherein there are two superposed layers and the layers are both irradiated polyethylene.

3. A process according to claim 2 including the further steps of placing an object on a support, positioning the unitary blister over said object, securing said blister to said support and heating the blister to shrink it and form a tight package around said object.

References Cited in the file of this patent

UNITED STATES PATENTS

| | | |
|---|---|---|
| 2,328,798 | Gardner | Sept. 7, 1943 |
| 2,690,593 | Abercrombie | Oct. 5, 1954 |
| 2,736,065 | Wilcox | Feb. 28, 1956 |
| 2,749,572 | Nowak | June 12, 1956 |
| 2,750,719 | Wandelt | June 19, 1956 |
| 2,855,517 | Rainer et al. | Oct. 7, 1958 |
| 2,855,735 | Groth | Oct. 14, 1958 |
| 2,897,546 | Clapp et al. | Aug. 4, 1959 |
| 2,904,943 | Dreyfus et al. | Sept. 22, 1959 |
| 2,927,409 | Heyer | Mar. 8, 1960 |
| 2,958,266 | Wilson | Nov. 1, 1960 |

FOREIGN PATENTS

| | | |
|---|---|---|
| 670,078 | Great Britain | Apr. 16, 1952 |
| 676,727 | Great Britain | July 30, 1952 |